United States Patent
Fukuda et al.

(10) Patent No.: US 12,077,020 B2
(45) Date of Patent: Sep. 3, 2024

(54) MASS ASYMMETRIC TIRE

(71) Applicant: Compagnie Generale Des Etablissements Michelin, Clermont-Ferrand (FR)

(72) Inventors: Kenji Fukuda, Tokyo (JP); Jacques Babaud, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 62 days.

(21) Appl. No.: 18/013,111

(22) PCT Filed: Jun. 30, 2020

(86) PCT No.: PCT/JP2020/025613
§ 371 (c)(1),
(2) Date: Dec. 27, 2022

(87) PCT Pub. No.: WO2022/003804
PCT Pub. Date: Jan. 6, 2022

(65) Prior Publication Data
US 2023/0278368 A1  Sep. 7, 2023

(51) Int. Cl.
*B60C 3/06* (2006.01)
*B60C 9/02* (2006.01)
*B60C 13/00* (2006.01)

(52) U.S. Cl.
CPC .............. *B60C 3/06* (2013.01); *B60C 9/0292* (2013.01); *B60C 13/003* (2013.01)

(58) Field of Classification Search
CPC .... B60C 3/06; B60C 9/17; B60C 9/30; B60C 15/0236; B60C 2015/0696
See application file for complete search history.

(56) References Cited

U.S. PATENT DOCUMENTS 3,339,610 A * 9/1967 Fausti .................. B60C 9/0207
152/554
4,120,337 A * 10/1978 Soma ................... B60C 9/0292
152/454

(Continued)

FOREIGN PATENT DOCUMENTS

DE  102005044354 A1  3/2006
FR     2978083 A1    1/2013

(Continued)

OTHER PUBLICATIONS

Machine Translation: JP-2003335112-A, Inoue Y, (Year: 2024).*

(Continued)

*Primary Examiner* — Kendra Ly
(74) *Attorney, Agent, or Firm* — Dickinson Wright PLLC; Steven C. Hurles

(57) ABSTRACT

The tire includes a summit surrounded by side portions terminating in beads provided to cooperate with a mounting rim. A carcass reinforcement is surmounted by a summit reinforcement composed of reinforcing plies. When the tire is mounted onto its standard mounting rim and inflated with its nominal pressure, each side portion has an upper side point, a bottom side point, an intermediate side point, an upper side portion, and a bottom side portion. A weight of the bottom side portion on one side portion is at least 15% lighter than a weight of the bottom side portion on another side portion.

4 Claims, 2 Drawing Sheets

(56) References Cited

U.S. PATENT DOCUMENTS

| | | | |
|---|---|---|---|
| 6,267,166 B1 * | 7/2001 | Secondari | B60C 9/30 |
| | | | 152/554 |
| 2002/0062896 A1 * | 5/2002 | Ikeda | B60C 11/00 |
| | | | 152/526 |
| 2004/0226642 A1 * | 11/2004 | Muhlhoff | B60C 13/009 |
| | | | 152/553 |
| 2010/0018623 A1 * | 1/2010 | Yamaura | B60C 15/06 |
| | | | 152/517 |
| 2010/0252161 A1 * | 10/2010 | Ito | B60C 11/01 |
| | | | 152/454 |

FOREIGN PATENT DOCUMENTS

| | | | |
|---|---|---|---|
| JP | H04201604 A | | 7/1992 |
| JP | 2003335112 A | * | 11/2003 |
| JP | 2004359042 A | * | 12/2004 |
| JP | 2007168544 A | * | 7/2007 |
| JP | 2008143305 A | * | 6/2008 |
| JP | 2008279796 A | * | 11/2008 |
| JP | 2012171433 A | * | 9/2012 |
| JP | 2013018345 A | | 1/2013 |

OTHER PUBLICATIONS

Machine Translation: JP-2007168544-A, Fukuda H, (Year: 2024).*
Machine Translation: JP-2004359042-A, Inoue Y, (Year: 2024).*
Machine Translation: JP-2008143305-A, Miyazaki M, (Year: 2024).*
Machine Translation: JP-2008279796-A, Takahashi A, (Year: 2024).*
Machine Translation: JP-2012171433-A, Ito T, (Year: 2024).*

* cited by examiner

[Fig. 1]
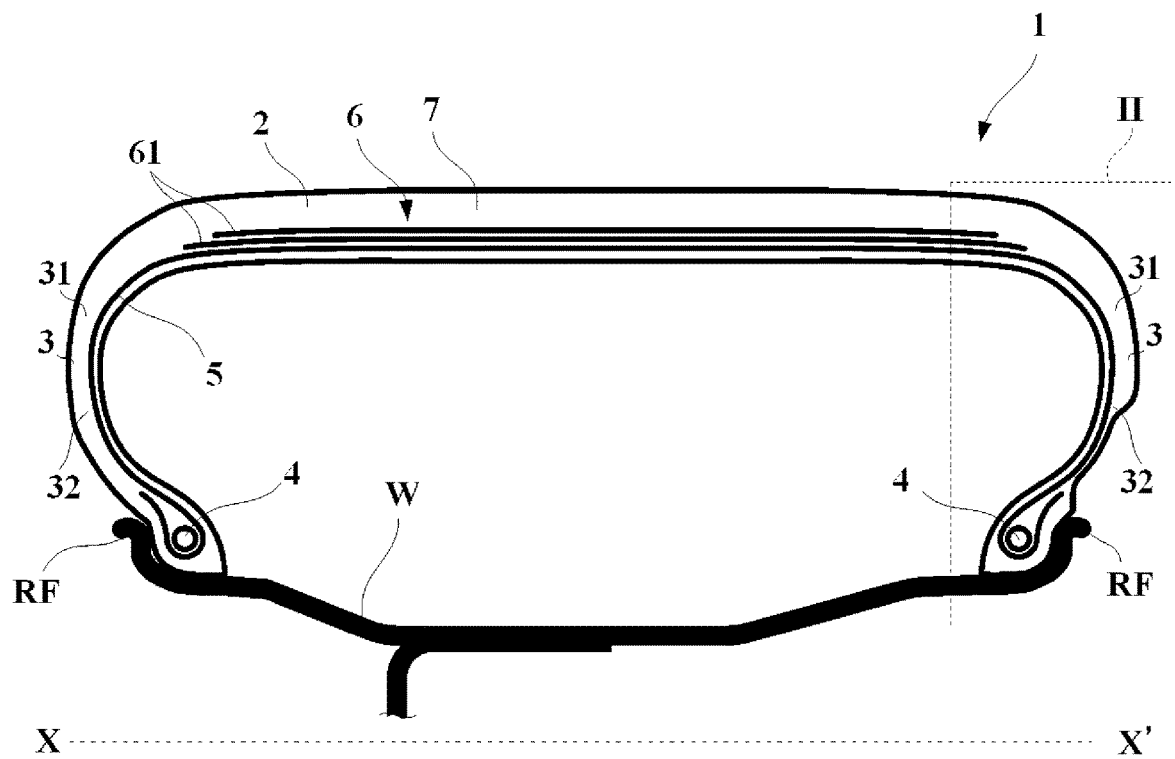
[Fig. 2]
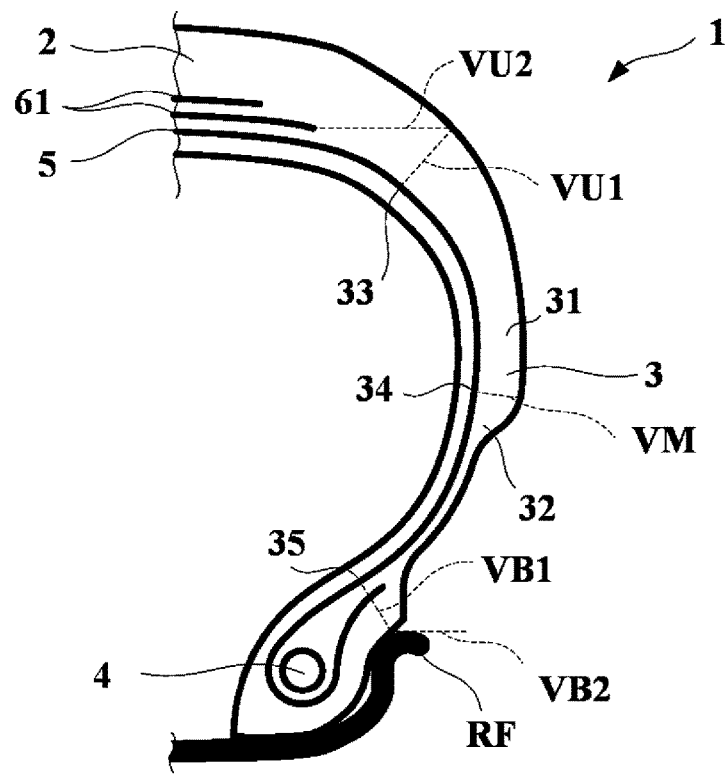

[Fig. 3]
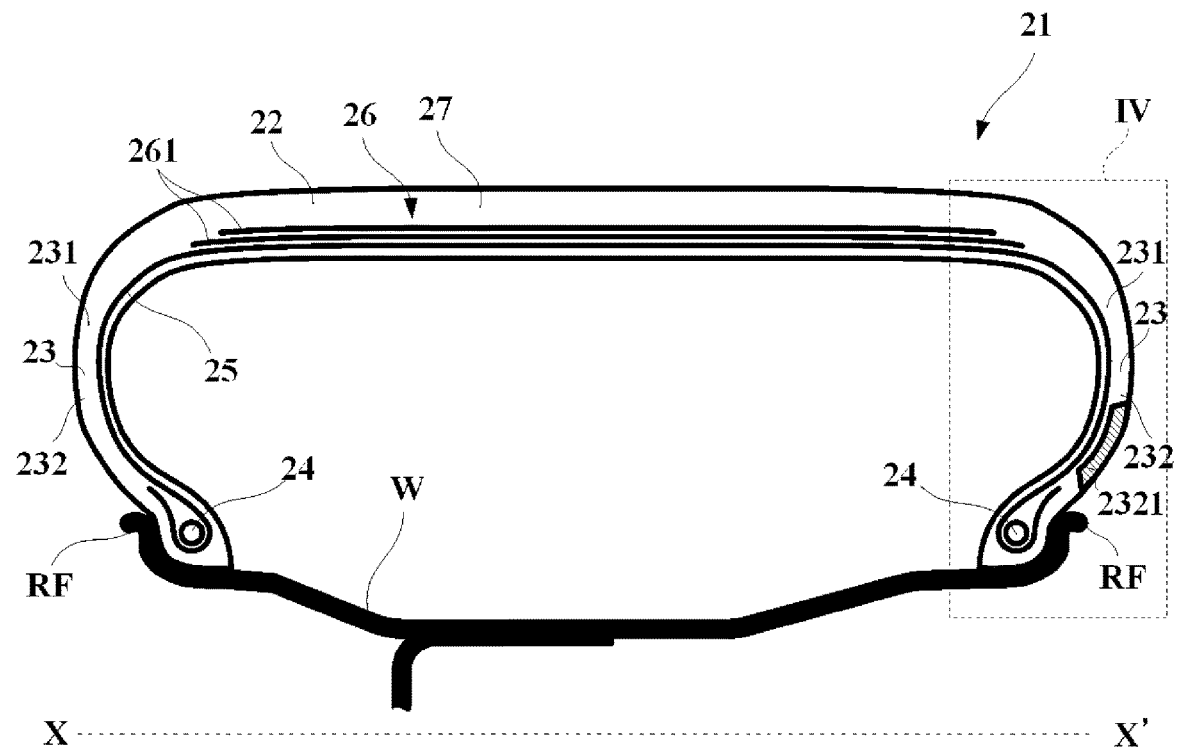
[Fig. 4]
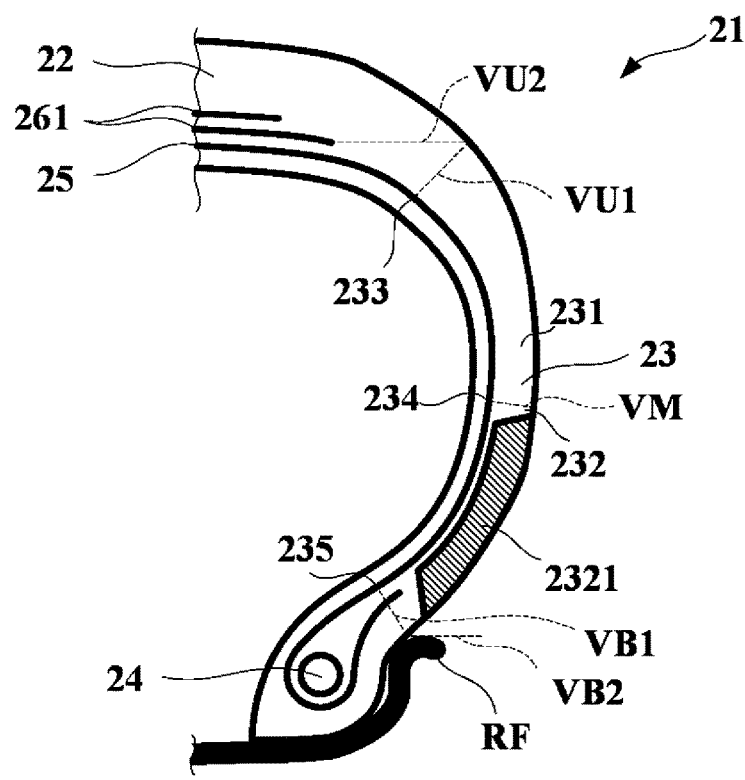

MASS ASYMMETRIC TIRE

CROSS-REFERENCE TO RELATED APPLICATION

This application claims priority to and the benefit of PCT Patent Application No. PCT/JP2020/025613 filed on 30 Jun. 2020, entitled "A MASS ASYMMETRIC TIRE."

BACKGROUND

1. Technical Field

The present disclosure relates to a tire and in particular a tire having asymmetrical mass from one side to another.

2. Background Art

In recent years, premiumisation and quality improvement of vehicles lead, from the view point of occupant's comfort and environmental considerations in particular toward an electrification of a vehicle, desire to various noise reductions.

It is known that the noise from the tires includes various components, that is a component from external noise and a component from internal noise. The internal noise includes a vibration due to excitation of a tread portion during rolling, the vibration is transmitted to a wheel rim, an axis, a suspension and a body of the vehicle then heard in an interior of the vehicle as noise.

In order to improve such noise, it is known that change on tire's vibration characteristics is effective. Various solutions have been proposed to improve such noise.

JPH05193310 discloses a pneumatic tire having a ratio (Ho/Hi) of a damping coefficient, Ho being the damping coefficient of an outer side sidewall calculated from an average thickness Go of the outer side sidewall and a loss tangent tan delta o (Go×tan delta o), Hi being the damping coefficient of an inner side sidewall calculated from an average thickness Gi of the inner side sidewall and a loss tangent tan delta i (Gi×tan delta i), is set in a range of 1.2-6.5 for improving comfort performance without degrading handling performance.

JPH05193311 discloses a pneumatic tire having an average thickness GU of the region of each of sidewall which extends from a position corresponding to a widest portion of the tire toward a tread and GL of the region of the side wall which extends from the same position toward a bead are set different from each other, the average thickness GU of the tread-side region being set to not less than 2.5 mm with the average thickness GL of the bead-side region set to less than 2.5 mm and not less than 1.0 mm for decreasing a tire mass without degrading a cut resistance of the sidewall.

FR2978083 discloses a tire with a maximum axial width SW and axial width RW at the beads, comprising a crown reinforcement of width TW and a radial carcass reinforcement, in which tire, when it is fitted onto its mounting rim and inflated to its service pressure and equilibrium, the following conditions are satisfied: Thy/SW=75%, TWIRW=85% and X/SH=50%, where X is the radial height at which the tire has its maximum axial width and SH denotes the radial height of the tire: Y/SH=80%, where Y is the radial height of the carcass reinforcement at the end of the crown reinforcement; and Z/SH=90%, where Z denotes the radial height of the carcass reinforcement, and in which the absolute value of the angle a between the tangent to the carcass reinforcement at the points of the carcass reinforcement having the same axial positions as the axial ends of the crown reinforcement and the axial direction is less than or equal to 22°. DE102005044354 discloses a vehicle tire includes a running strip, a carcass, stiffening elements, stabilizing elements, and a bead. The running strip and the carcass form a convex shoulder which extends into a concave side wall section. The stiffening element and the stabilising element are embedded in the bead section. JP2004359042 discloses a pneumatic tire for an automobile equipped with an annular swollen section having an inner peripheral side surface which is confronted with an outer peripheral side curved surface of the rim flange, on the side wall section of at least on one side, and is equipped with at least one row of protrusions which are continuously provided in the peripheral direction on the tire inner peripheral side of the swollen section. A height R1 of the peak P1 of the swollen section with a nominal diameter NR as the reference is 55 mm or higher, and a height Hl from the side wall 2 extension line of the peak P1 is 3 mm or higher. The relationship between a height R2 at a position P2 with the nominal diameter NR as the reference and a height HR of the upper end surface of the rim flange 21 satisfies 4 mm<R2−HR<10 mm. JP2013018345 discloses a tire wheel assembly body for an in-wheel motor includes a pneumatic tire and a wheel. A carcass is stretched over bead cores at both ends via a tread part, and both ends of the carcass are folded back at the bead core so as to hold the bead core and a bead filler therebetween. The inner diameter of a bead section located at the inner side of mounting on the vehicle is formed larger than that of a bead section located at the outer side of mounting on the vehicle, to form a tire with a different diameter. When a tire cross sectional height at the inner side of mounting on the vehicle is defined as Hin, a tire cross sectional height at the outer side of mounting on the vehicle is defined as Hout, the height of the bead filler at the inner side of mounting on the vehicle is defined as Fin, the height of the bead filler at the outer side of mounting on the vehicle is Fout, and K is a coefficient, K.Hout/Hin=Fout/Fin, where $1.0 \le K \le 4.0$ (expression 1) is satisfied. JPH04201604 discloses a tire having different side wall height on the inside and outside, an automobile runs in the condition where tire is thin when it goes straight, and the contact width of road surface and tire becomes wide by crushing tire on the outside at the time of cornering so that grip force increases. Also, diameter of the inside A of a wheel on which the tire is mounted is made large, and diameter of the outside B is made small. Thus, it is possible to improve grip force without making tire and wheel flat and improve feeling of ride at low fuel cost.

CITATION LIST

Patent Literature

[PTL 1]
JPH05193310
[PTL 2]
JPH05193311
[PTL 3]
FR2978083
[PTL 4]
DE102005044354
[PTL 5]
JP2004359042
[PTL 6]
JP2013018345
[PTL 7]
JPH04201604

However, with the solutions disclosed in these documents, improvement on noise performance is not satisfactory. Also at the same time, degradation of handling performance is not an acceptable level. Thus, there is a desire to further improve noise performance while maintaining reasonable level on handling performance. Therefore, there is a need for a tire which provides improvement on noise performance while maintaining reasonable level on handling performance.

Definitions

A "radial direction/orientation" is a direction/orientation perpendicular to axis of rotation of the tire. This direction/orientation corresponds to thickness orientation of the tread.

An "axial direction/orientation" is a direction/orientation parallel to axis of rotation of the tire.

A "circumferential direction/orientation" is a direction/orientation which is tangential to any circle centered on axis of rotation. This direction/orientation is perpendicular to both the axial direction/orientation and the radial direction/orientation.

A "tire" means all types of elastic tire whether or not subjected to an internal pressure.

A "ply" or a "reinforcing ply" means a layer of material composed of parallelly arranged a plurality of single and/or stranded wire of metal or fiber wire such as steel, polyester or nylon, covered with rubber composition. An extension direction of such metal or fiber wire may be different from tire rotation direction.

It is thus an object of the disclosure to provide a tire which provides improvement on noise performance while maintaining reasonable level on handling performance.

SUMMARY

The present disclosure provides a tire intended to be mounted on a mounting rim, the tire comprising a summit surrounded on both sides by side portions terminating in beads provided to cooperate with the mounting rim, the tire comprising at least one carcass reinforcement extending in the summit and the side portions and anchored at its two ends in the beads, the at least one carcass reinforcement being surmounted radially on the outside by a summit reinforcement composed of a plurality of reinforcing plies, the summit reinforcement being surmounted radially on the outside by a tread intended to come into contact with ground during rolling, when the tire being mounted onto its standard mounting rim and inflated with its nominal pressure, each the side portion having three points, an upper side point defined as a point on radially outermost carcass reinforcement where a virtual line perpendicular to said carcass reinforcement extending from a point on an outline of the tire intersecting with a virtual horizontal line extending from axial extremity of a widest reinforcing ply, a bottom side point defined as a point on radially outermost carcass reinforcement where a virtual line perpendicular to said carcass reinforcement extending from a point on an outline of the tire intersecting with a virtual horizontal line touching to radially outermost of a rim flange, an intermediate side point defined as a point on radially outermost carcass reinforcement where a length from the bottom side point along said carcass reinforcement being 60% of a length between the upper side point and the bottom side point along said carcass reinforcement, each the side portion comprising, an upper side portion defined as a portion of the side portion outside of the radially outermost carcass reinforcement delimited by a virtual line passing through the upper side point and by a virtual line passing through the intermediate side point, a bottom side portion defined as a portion of the side portion outside of the radially outermost carcass reinforcement delimited by a virtual line passing through the bottom side point and by the virtual line passing through the intermediate side point, the weight of the bottom side portion on one side portion being at least 15% lighter than the weight of the bottom side portion on another side portion, the tire has intended mounting side (inside-outside), and the lighter bottom side portion locates inside of the intended mounting side, a weight of the upper side portion without the lighter bottom side portion is lighter than a weight of the upper side portion provided with the lighter bottom side portion.

This arrangement provides an improvement on noise performance while maintaining reasonable level on handling performance.

Since the weight of the bottom side portion on one side portion is at least 15% lighter than the weight of the bottom side portion on another side portion, a dynamic torsional stiffness of the tire, one component of tire's dynamic rigidity transferring vibration from ground can be reduced effectively. Therefore, it is possible to improve noise performance.

If a difference in weight between two bottom side portions is less than 15%, there is a risk that an improvement on noise performance would be insufficient due to insufficient reduction of the dynamic torsional stiffness. By setting this difference in weight between two bottom side portions at least 15%, it is possible to improve noise performance.

The weight of the bottom side portion on one side portion is preferably at least 20% lighter than the weight of the bottom side portion on another side portion.

Since the bottom side portion defined as a portion of the side portion outside of the radially outermost carcass reinforcement between the bottom side point defined as a point on radially outermost carcass reinforcement where a virtual line perpendicular to said carcass reinforcement extending from a point on an outline of the tire intersecting with a virtual horizontal line touching to radially outermost of a rim flange and the intermediate side point defined as a point on radially outermost carcass reinforcement where a length from the bottom side point along said carcass reinforcement being 60% of a length between the upper side point and the bottom side point along said carcass reinforcement, the side portion could maintain enough volume of material to perform reasonable level on handling performance. Therefore, it is possible to improve noise performance while maintaining reasonable level on handling performance.

If the intermediate side point locates at the length from the bottom side point along the carcass reinforcement more than 60% of the length between the upper side point and the bottom side point along the carcass reinforcement, there is a risk that the side portion in total couldn't maintain enough volume of material to perform reasonable level on handling performance. By setting this intermediate side point at the length from the bottom side point along the carcass reinforcement being 60% of the length between the upper side point and the bottom side point along the carcass reinforcement, it is possible to improve noise performance while maintaining reasonable level on handling performance.

Since the tire has intended mounting side (inside-outside), and the lighter bottom side portion locates inside of the intended mounting side, it is possible to improve noise performance while maintaining reasonable level on handling performance efficiently, as a stiffness of the bottom side portion is more important on outside than on inside.

Since a weight of the upper side portion without the lighter bottom side portion is lighter than a weight of the upper side portion provided with the lighter bottom side portion, it is possible to further improve noise performance as the lighter upper side portion without the lighter bottom side portion contributes to dynamic torsional stiffness reduction.

In another preferred embodiment, the weight of the bottom side portion on one side portion is at most 50% lighter than the weight of the bottom side portion on another side portion.

If the weight of the bottom side portion on one side portion is more than 50% lighter than the weight of the bottom side portion on another side portion, there is a risk of handling performance degradation, or endurance performance degradation due to insufficient rubber volume at the bottom side portion. By setting this weight of the bottom side portion on one side portion is at most 50% lighter than the weight of the bottom side portion on another side portion, it is possible to improve noise performance while maintaining endurance performance and reasonable level on handling performance at the same time.

The weight of the bottom side portion on one side portion is preferably at most 45% lighter than the weight of the bottom side portion on another side portion, more preferably at most 40% lighter than the weight of the bottom side portion on another side portion.

In another preferred embodiment, an outline of the tire between two side portions is asymmetric.

According to this arrangement, it is possible to manufacture such the tire with lower raw material consumption thus possible to improve cost effectiveness of the tire.

In another preferred embodiment, an outline of the tire between two side portions is symmetric.

According to this arrangement, it is possible to manufacture such the tire using existing mold having a standard profile on side portion, thus possible to improve cost effectiveness of the tire.

According to the arrangements described above, it is possible to provide an improvement on noise performance while maintaining reasonable level on handling performance.

BRIEF DESCRIPTION OF THE DRAWINGS

Other characteristics and advantages of the disclosure arise from the description made hereafter in reference to the annexed drawings which show, as nonrestrictive examples, the embodiment of the disclosure.

In these drawings:

FIG. 1 is a schematic cross sectional view of a tire according to a first embodiment of the present disclosure;

FIG. 2 is an enlarged schematic view showing a portion indicated as II in FIG. 1;

FIG. 3 is a schematic cross sectional view of a tire according to a second embodiment of the present disclosure;

FIG. 4 is an enlarged schematic view showing a portion indicated as IV in FIG. 3;

DESCRIPTION OF EMBODIMENTS

Preferred embodiments of the present disclosure will be described below referring to the drawings.

A tire 1 according to a first embodiment of the present disclosure will be described referring to FIGS. 1 and 2. FIG. 1 is a schematic cross sectional view of a tire according to a first embodiment of the present disclosure. FIG. 2 is an enlarged schematic view showing a portion indicated as II in FIG. 1.

The tire 1 is a tire having dimension 235/45R18 intended to be mounted on a mounting rim W and comprising a summit 2 surrounded on both sides by side portions 3 terminating in beads 4 provided to cooperate with the mounting rim W. The tire 1 comprising at least one carcass reinforcement 5 extending in the summit 2 and the side portions 3 and anchored at its two ends in the beads 4. The mounting rim W terminates on both axial sides by a rim flange RF. In this first embodiment, the tire 1 has one carcass reinforcement 5.

As shown in FIG. 1, the at least one carcass reinforcement 5 being surmounted radially on the outside by a summit reinforcement 6 composed of a plurality of reinforcing plies 61 and the summit reinforcement 6 being surmounted radially on the outside by a tread 7 intended to come into contact with ground during rolling. In this first embodiment, the summit reinforcement 6 is composed of two reinforcing plies 61.

As shown in FIGS. 1 and 2, each the side portion 3 having three points when the tire 1 being mounted onto its standard mounting rim and inflated with its nominal pressure: an upper side point 33 defined as a point on radially outermost carcass reinforcement 5 where a virtual line VU1 perpendicular to said carcass reinforcement 5 extending from a point on an outline of the tire 1 intersecting with a virtual horizontal line VU2 extending from axial extremity of a widest reinforcing ply 61, a bottom side point 35 defined as a point on radially outermost carcass reinforcement 5 where a virtual line VB1 perpendicular to said carcass reinforcement 5 extending from a point on an outline of the tire 1 intersecting with a virtual horizontal line VB2 touching to radially outermost of a rim flange RF, an intermediate side point 34 defined as a point on radially outermost carcass reinforcement 5 where a length from the bottom side point 35 along said carcass reinforcement 5 being 60% of a length between the upper side point 33 and the bottom side point 35 along said carcass reinforcement 5. According to ETRTO standard manual 2020, the standard mounting rim size is 8.0 inches, and nominal pressure is 290 kPa if extra load, 250 kPa if non-extra load.

As shown in FIGS. 1 and 2, each the side portion 3 comprising an upper side portion 31 defined as a portion of the side portion 3 outside of the radially outermost carcass reinforcement 5 delimited by a virtual line passing through the upper side point 33 and by a virtual line passing through the intermediate side point 34, and a bottom side portion 32 defined as a portion of the side portion 3 outside of the radially outermost carcass reinforcement 5 delimited by a virtual line passing through the bottom side point 35 and by the virtual line passing through the intermediate side point 34. A weight of the bottom side portion 32 on one side portion 3 is at least 15% lighter than a weight of the bottom side portion 32 on another side portion 3.

As shown in FIGS. 1 and 2, an outline of the tire 1 between two side portions 3 is asymmetric for making the weight of the bottom side portion 32 on one side portion 3 being at least 15% lighter than the weight of the bottom side portion 32 on another side portion 3. An outline of the side portion 3 provided with lighter bottom side portion 32 is recessed from an outline of the side portion 3 provided without the lighter bottom side portion 32. The weight of the bottom side portion 32 on one side portion 3 is at most 50% lighter than the weight of the bottom side portion 32 on another side portion 3. Also, a weight of the upper side portion 31 without the lighter bottom side portion 32 is lighter than a weight of the upper side portion 31 provided with the lighter bottom side portion 32.

When comparing the weight of the bottom side portions 32 and/or the weight of the upper side portions 31, the upper side portion 31 should be delimited by the virtual line passing through the upper side point 33, the virtual line passing through the intermediate point 34 and the outermost carcass reinforcement 5, and the bottom side portion 32 should be delimited by the virtual line passing through the bottom side point 35, the virtual line passing through the intermediate point 34 and the outermost carcass reinforcement 5. The virtual line passing through the upper side point 33, the intermediate side point 34 and the bottom side point 35 should be equivalent respectively from one side portion 3 to another side portion 3, for example the virtual line VU1 as the virtual line passing through the upper side point 33, a virtual line VM perpendicular to the carcass reinforcement 5 as the virtual line passing through the intermediate side point 34 and the virtual line VB1 as the virtual line passing through the bottom side point 35.

Comparison of the weight of the bottom side portions 32 and/or the weight of the upper side portions 31 should be made by comparing whole weight of the bottom side portions 32 and/or the upper side portions 31. In case the weight of the bottom side portion 32 and/or the weight of the upper side portion 31 can be considered homogeneous in circumferential orientation, comparison of those weights may be made by comparing weights in a portion extracted along axial section.

As shown in FIGS. 1 and 2, the tire 1 has intended mounting side (inside-outside) in which in the present case outside being left side and inside being right side on the drawing, and the lighter bottom side portion 32 locates inside of the intended mounting side. The intended mounting side is often the case indicated on a surface of the side portion (sidewall) via characters like, for example "OUTSIDE", "INSIDE" or similar indication (not shown).

Since the weight of the bottom side portion 32 on one side portion 3 is at least 15% lighter than the weight of the bottom side portion 32 on another side portion 3, a dynamic torsional stiffness of the tire 1, one component of tire's dynamic rigidity transferring vibration from ground can be reduced effectively. Therefore, it is possible to improve noise performance.

If a difference in weight between two bottom side portions 32 is less than 15%, there is a risk that an improvement on noise performance would be insufficient due to insufficient reduction of the dynamic torsional stiffness. By setting this difference in weight between two bottom side portions 32 at least 15%, it is possible to improve noise performance.

The weight of the bottom side portion 32 on one side portion 3 is preferably at least 20% lighter than the weight of the bottom side portion 32 on another side portion 3.

Since the bottom side portion 32 defined as a portion of the side portion 3 outside of the radially outermost carcass reinforcement 5 between the bottom side point 35 defined as a point on radially outermost carcass reinforcement 5 where a virtual line perpendicular to said carcass reinforcement 5 extending from a point on an outline of the tire 1 intersecting with a virtual horizontal line touching to radially outermost of a rim flange RF and the intermediate side point 34 defined as a point on radially outermost carcass reinforcement 5 where a length from the bottom side point 35 along said carcass reinforcement 5 being 60% of a length between the upper side point 33 and the bottom side point 35 along said carcass reinforcement 5, the side portion 3 could maintain enough volume of material to perform reasonable level on handling performance. Therefore, it is possible to improve noise performance while maintaining reasonable level on handling performance.

If the intermediate side point 34 locates at the length from the bottom side point 35 along the carcass reinforcement 5 more than 60% of the length between the upper side point 33 and the bottom side point 35 along the carcass reinforcement 5, there is a risk that the side portion 3 in total couldn't maintain enough volume of material to perform reasonable level on handling performance. By setting this intermediate side point 34 at the length from the bottom side point 35 along the carcass reinforcement 5 being 60% of the length between the upper side point 33 and the bottom side point 35 along the carcass reinforcement 5, it is possible to improve noise performance while maintaining reasonable level on handling performance.

Since the weight of the bottom side portion 32 on one side portion is at most 50% lighter than the weight of the bottom side portion 32 on another side portion, it is possible to improve noise performance while maintaining endurance performance and reasonable level on handling performance at the same time.

If the weight of the bottom side portion 32 on one side portion is more than 50% lighter than the weight of the bottom side portion 32 on another side portion 3, there is a risk of handling performance degradation, or endurance performance degradation due to insufficient rubber volume at the bottom side portion 32.

The weight of the bottom side portion 32 on one side portion 3 is preferably at most 45% lighter than the weight of the bottom side portion 32 on another side portion 3, more preferably at most 40% lighter than the weight of the bottom side portion 32 on another side portion 3.

Since the weight of the upper side portion 31 without the lighter bottom side portion 32 is lighter than the weight of the upper side portion 31 provided with the lighter bottom side portion 32, it is possible to further improve noise performance as the lighter upper side portion 31 without the lighter bottom side portion 32 contributes to dynamic torsional stiffness reduction.

Since the tire 1 has intended mounting side (inside-outside), and the lighter bottom side portion 32 locates inside of the intended mounting side, it is possible to improve noise performance while maintaining reasonable level on handling performance efficiently, as a stiffness of the bottom side portion 32 is more important on outside than on inside.

Since the outline of the tire 1 between two side portions 3 is asymmetric, it is possible to manufacture such the tire with lower raw material consumption thus possible to improve cost effectiveness of the tire 1.

In case mounting the tire 1 onto the mounting rim W, it is preferable to use a mounting rim having an inset, an attaching disk part of the mounting rim W is axially offset outwardly from an axial center of the mounting rim W, instead of those having a zeroset (the attaching disk part of the mounting rim W is on the same plane with the axial center of the mounting rim W) or an outset (the attaching disk part of the mounting rim W is axially offset inwardly from the axial center of the mounting rim W) for effective noise performance improvement.

In case multiple number of carcass reinforcement 5 is provided, the upper side point 33, the intermediate side point 34 and the bottom side point 35 shall be considered on radially outermost carcass reinforcement 5, excluding a portion of the carcass reinforcement 5 after turning around the beads 4.

Similar effect may be able to achieve by adding a weight to one side of the bottom side portion 32 instead of lightening the weight of one side of the bottom side portion 32, but in view of energy and raw material consumption it is preferable to lighten the weight of one side of the bottom side portion 32.

It may be preferable to maintain minimum thickness of at least equal to 1.0 mm for the lightened bottom side portion 32 outward of the carcass reinforcement 5 for maintaining reasonable endurance performance.

A tire 21 according to a second embodiment of the present disclosure will be described referring to FIGS. 3 and 4. FIG. 3 is a schematic cross sectional view of a tire according to a second embodiment of the present disclosure. FIG. 4 is an enlarged schematic view showing a portion indicated as IV in FIG. 3. The construction of this second embodiment is similar to that of the first embodiment other than the arrangement shown in FIGS. 3 and 4, thus description will be made referring to FIGS. 3 and 4.

As shown in FIGS. 3 and 4, a tire 21 intended to be mounted on a mounting rim W and comprising a summit 22 surrounded on both sides by side portions 23 terminating in beads 24 provided to cooperate with the mounting rim W. The tire 21 comprising at least one carcass reinforcement 25 extending in the summit 22 and the side portions 23 and anchored at its two ends in the beads 24. The mounting rim W terminates on both axial sides by a rim flange RF. In this second embodiment, the tire 21 has one carcass reinforcement 25.

As shown in FIG. 3, the at least one carcass reinforcement 25 being surmounted radially on the outside by a summit reinforcement 26 composed of a plurality of reinforcing plies 261 and the summit reinforcement 26 being surmounted radially on the outside by a tread 27 intended to come into contact with ground during rolling. In this second embodiment, the summit reinforcement 26 is composed of two reinforcing plies 261.

As shown in FIGS. 3 and 4, each the side portion 23 having three points when the tire 21 being mounted onto its standard mounting rim and inflated with its nominal pressure: an upper side point 233 defined as a point on radially outermost carcass reinforcement 25 where a virtual line VU1 perpendicular to said carcass reinforcement 25 extending from a point on an outline of the tire 21 intersecting with a virtual horizontal line VU2 extending from axial extremity of a widest reinforcing ply 261, a bottom side point 235 defined as a point on radially outermost carcass reinforcement 25 where a virtual line VB1 perpendicular to said carcass reinforcement 25 extending from a point on an outline of the tire 21 intersecting with a virtual horizontal line VB2 touching to radially outermost of a rim flange RF, an intermediate side point 234 defined as a point on radially outermost carcass reinforcement 25 where a length from the bottom side point 235 along said carcass reinforcement 25 being 60% of a length between the upper side point 233 and the bottom side point 235 along said carcass reinforcement 25. According to ETRTO standard manual 2020, the standard mounting rim size is 8.0 inches, and nominal pressure is 290 kPa if extra load, 250 kPa if non-extra load.

As shown in FIGS. 3 and 4, each the side portion 23 comprising an upper side portion 231 defined as a portion of the side portion 23 outside of the radially outermost carcass reinforcement 25 delimited by a virtual line passing through the upper side point 233 and by a virtual line passing through the intermediate side point 234, and a bottom side portion 232 defined as a portion of the side portion 23 outside of the radially outermost carcass reinforcement 25 delimited by a virtual line passing through the bottom side point 235 and the virtual line passing through the intermediate side point 234. A weight of the bottom side portion 232 on one side portion 23 is at least 15% lighter than a weight of the bottom side portion 232 on another side portion 23, thanks to a lightweight bottom side portion 2321, and an outline of the tire 21 between two side portions 23 is symmetric.

Since the outline of the tire 21 between two side portions 23 is symmetric, it is possible to manufacture such the tire 21 using existing mold having a standard profile on side portion 23, thus possible to improve cost effectiveness of the tire 21.

The lightweight bottom side portion 2321 may be made of foamed rubber, a material having low specific gravity such as plastics or resins, a material having low density or mixture of these materials.

Similar effect may be able to achieve by adding a weight to one side of the bottom side portion 232 at least partially instead of using lightweight bottom side portion 2321, but in view of energy and raw material consumption it is preferable to lighten the weight of one side of the bottom side portion 232 thanks to the lightweight bottom side portion 2321.

The disclosure is not limited to the examples described and represented and various modifications can be made there without leaving its framework.

EXAMPLES

In order to confirm the effect of the present disclosure, two types of Example to which the present disclosure is applied and other type of Reference were prepared.

The Example 1 was a tire as described in the above the first embodiment provided with one side of the bottom side portion 25.4% lighter than another side of the bottom side portion considering an area delimited by the virtual line VM and the virtual line VB1. The Example 2 was a tire similar to the Example 1 provided with one side of the bottom side portion 32.3% lighter than another side of the bottom side portion considering an area equivalent to that of the Example 1. The Reference was a tire provided with equivalent weight on two bottom side portions. The weight of the upper side portions of each the Examples and the Reference were equivalent between the two side portions considering an area delimited by the virtual line VU1 and the virtual line VM. All the Examples and Reference were in the same tire size 235/45R18, and had the same internal construction as standard radial pneumatic tire using the same material.

Noise Performance Tests:

Unused test tires were mounted onto all four wheels of a 2,500 cc rear-wheel drive hybrid vehicle. On a straight path weather asphalt, the vehicle was coasting down from 105 kph to 50 kph with engine cut off. An interior noise was measured using a microphone positioned at a passenger's ear close to window. An average A-weighted sound pressure level between 50 and 500 Hz from 85 kph to 75 kph was calculated.

The results are shown in table 1. In this table 1, results are represented by difference in dB(A) against the Reference, lower the value indicates better the performance.

Handling Performance Tests:

A cornering power of unused test tires mounted onto a standard rim and inflated to nominal internal pressure were measured using a flat belt tire tester. A load of 460 kg was applied while tires driven at a constant speed of 80 kph, lateral force at a slip angle of +1° was measured, and the lateral forces measured at +1° and at −1° were averaged.

The results are also shown in table 1. In this table 1, results are represented by an index of 100 for the Reference, higher the number indicates better the performance.

TABLE 1

| | Example 1 | Example 2 | Reference |
|---|---|---|---|
| Noise performance (dB(A)) | −0.9 | −1.5 | — |
| Handling performance (index) | 100 | 100 | 100 |

As seen from table 1, the Examples show improvement on noise performance while maintaining handling performance.

REFERENCE SIGNS LIST 1, 21 tire
2, 22 summit
3, 23 side portion
31, 231 upper side portion
32, 232 bottom side portion
33, 233 upper side point
34, 234 intermediate side point
35, 235 bottom side point
2321 lightweight bottom side portion
4, 24 bead
5, 25 carcass reinforcement
6, 26 summit reinforcement
61, 261 reinforcing ply
7, 27 tread

What is claimed is:

1. A tire intended to be mounted on a mounting rim, the tire comprising a summit surrounded on both sides by side portions terminating in beads provided to cooperate with the mounting rim, the tire comprising at least one carcass reinforcement extending in the summit and the side portions and anchored at its two ends in the beads, the at least one carcass reinforcement being surmounted radially on the outside by a summit reinforcement composed of a plurality of reinforcing plies, the summit reinforcement being surmounted radially on the outside by a tread intended to come into contact with ground during rolling, when the tire being mounted onto its standard mounting rim and inflated with its nominal pressure, each the side portion having three points;

an upper side point defined as a point on radially outermost carcass reinforcement where a virtual line perpendicular to said carcass reinforcement extending from a point on an outline of the tire intersecting with a virtual horizontal line extending from axial extremity of a widest reinforcing ply;

a bottom side point defined as a point on radially outermost carcass reinforcement where a virtual line perpendicular to said carcass reinforcement extending from a point on an outline of the tire intersecting with a virtual horizontal line touching to radially outermost of a rim flange;

an intermediate side point defined as a point on radially outermost carcass reinforcement where a length from the bottom side point along said carcass reinforcement being 60% of a length between the upper side point and the bottom side point along said carcass reinforcement, each the side portion comprising;

an upper side portion defined as a portion of the side portion outside of the radially outermost carcass reinforcement delimited by a virtual line passing through the upper side point and by a virtual line passing through the intermediate side point;

a bottom side portion defined as a portion of the side portion outside of the radially outermost carcass reinforcement delimited by a virtual line passing through the bottom side point and by the virtual line passing through the intermediate side point, wherein a weight of the bottom side portion on one side portion is at least 15% lighter than a weight of the bottom side portion on another side portion, and wherein the tire has intended mounting side (inside-outside), and in that the lighter bottom side portion locates inside of the intended mounting side, and in that a weight of the upper side portion without the lighter bottom side portion is lighter than a weight of the upper side portion provided with the lighter bottom side portion.

2. The tire according to claim 1, wherein the weight of the bottom side portion on one side portion is at most 50% lighter than the weight of the bottom side portion on another side portion.

3. The tire according to claim 1, wherein an outline of the tire between two side portions is asymmetric.

4. The tire according to claim 1, wherein an outline of the tire between two side portions is symmetric.

* * * * *